United States Patent [19]

Edwards et al.

[11] 4,378,200
[45] Mar. 29, 1983

[54] POWER TRANSMISSION

[75] Inventors: Thomas L. Edwards, Almont; Raymond P. Lambeck, Bloomfield Hills, both of Mich.

[73] Assignee: Vickers, Incorporated, Troy, Mich.

[21] Appl. No.: 183,937

[22] Filed: Sep. 4, 1980

[51] Int. Cl.³ .............................................. F04B 49/00
[52] U.S. Cl. ...................................... 417/216; 60/449; 417/218; 417/244
[58] Field of Search ........................ 417/216, 218–222, 417/244; 60/445, 447, 449, 428

[56] References Cited

U.S. PATENT DOCUMENTS

| | | | |
|---|---|---|---|
| 3,412,683 | 11/1968 | Anderson | 417/218 |
| 3,543,508 | 12/1970 | Schwab | 60/449 |
| 3,625,637 | 12/1971 | Kiwalle et al. | 417/218 |
| 3,742,820 | 7/1973 | Lonnemo | 417/214 X |

Primary Examiner—Edward K. Look
Attorney, Agent, or Firm—Barnes, Kisselle, Raisch, Choate, Whittemore & Hulbert

[57] ABSTRACT

A hydraulic system comprising a full flow supercharged variable displacement pump and a fixed displacement charge pump adapted to be driven by the same prime mover as the variable displacement pump for supplying fluid to the variable displacement pump. An orifice is provided in the supply line to the variable displacement pump, a circuit is provided from a point downstream of the orifice to tank pressure, and a feedback valve is provided in series with the circuit. The feedback valve comprises a pair of mutually and oppositely adjustable flow restrictions in series with said circuit. The restrictions are connected to the displacement varying means to vary them equally and oppositely in proportion to the movements of the displacement varying means. A speed sensing control valve is responsive to the pressure level between the two restrictions and the pressure level upstream of the orifice and is connected to the outlet of the variable displacement pump and operable to operate the displacement varying means to reduce the displacement of the pump when the pressure differential between the pressure at the outlet of the feedback means and the pressure upstream of the orifice falls below a predetermined value.

3 Claims, 10 Drawing Figures

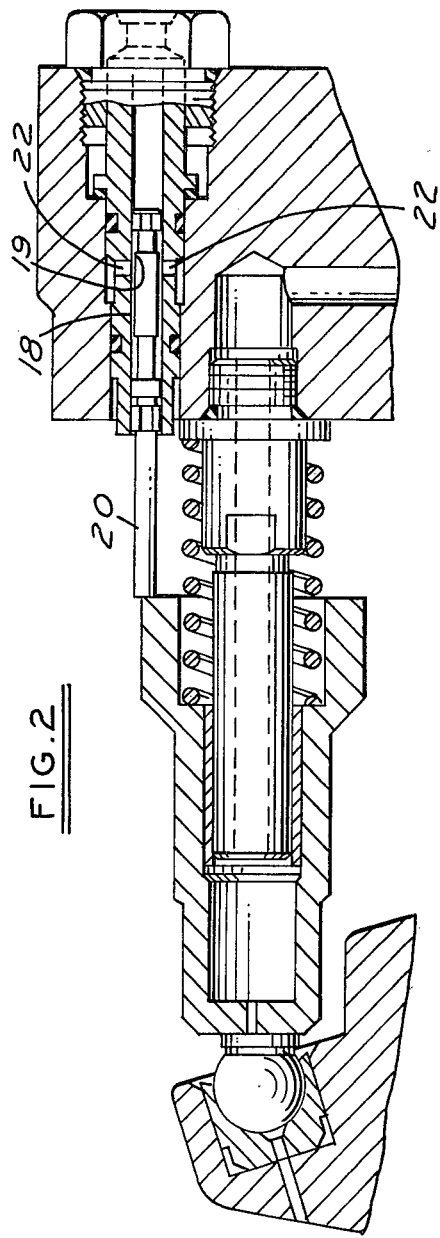
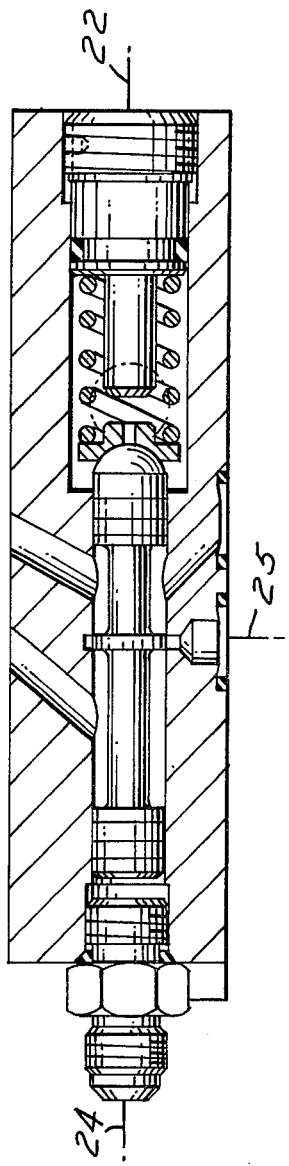
FIG.2
FIG.3

POWER TRANSMISSION

This invention relates to power transmission and particularly to a hydraulic system such as used on vehicles where the power of a hydraulic pump is shared with other hydraulic and mechanical devices.

BACKGROUND AND SUMMARY OF THE INVENTION

In a hydraulic system wherein a variable speed pump having a speed sensitive unloading control is driven by a prime mover such as a diesel engine, it has been found that the characteristics of a diesel engine are such that the engine and pump will tend to produce an unstable system under certain conditions. Specifically, as the pump displacement is reduced when the torque is reduced, the engine will tend to operate at high speed which will drive the pump to full displacement so that a potentially unstable condition exists.

Among the objectives of the present invention are to provide a hydraulic system which obviates these problems and wherein the power is limited in response to speed of the prime mover which drives the hydraulic pump.

In accordance with the invention, the hydraulic system comprises a full flow supercharged variable displacement pump and a fixed flow charge pump adapted to be driven by the same prime mover as the variable displacement pump for supplying fluid to the variable displacement pump. An orifice is provided in the supply line from the charge pump to the variable displacement pump. A circuit is provided from a point downstream of the orifice to tank pressure, and a feedback valve is provided in series with the circuit. The feedback valve comprises a pair of mutually and oppositely adjustable flow restrictions in series with said circuit.

The restrictions are connected to the displacement varying means to vary them equally and oppositely in proportion to the movements of the displacement varying means. A speed sensing control valve is responsive to the pressure level between the two restrictions and the pressure level upstream of the orifice and is connected to the outlet of the variable displacement pump and operable to operate the displacement varying means to reduce the displacement of the pump when the pressure differential between the pressure at the outlet of the feedback means and the pressure upstream of the orifice falls below a predetermined value.

DESCRIPTION OF THE DRAWINGS

FIG. 2 is a fragmentary longitudinal sectional view of a portion of a variable displacement pump and feedback valve used in the system.

FIG. 3 is a longitudinal sectional view of a speed sensing valve used in the system.

DESCRIPTION

Figure 1:
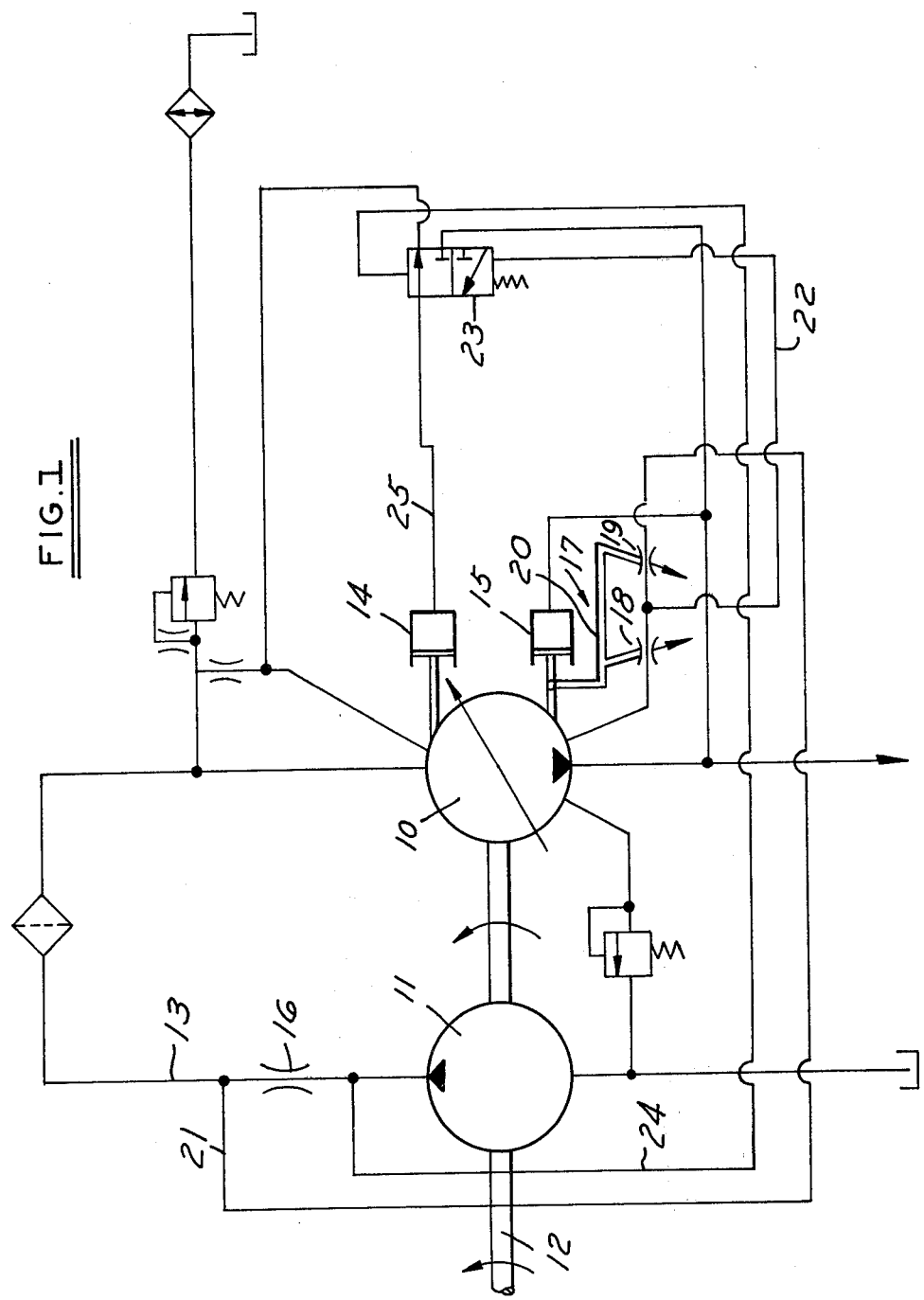
FIG. 1 is a schematic circuit diagram of a hydraulic system embodying the invention.

Referring to FIG. 1, the hydraulic system embodying the invention comprises a full flow supercharged variable displacement pump 10 and a fixed displacement charge pump 11 driven by a common shaft from a gear box which is, in turn, driven by a prime mover such as an engine, not shown. The charge pump 11 supplied fluid to the inlet of the variable displacement pump through a line 13.

The variable displacement pump 10 is of conventional construction and includes means for varying the displacement of the pump such as a destroking piston 14 and a stroking piston 15. Conventionally, the charge pump 11 is made of an integral part of the variable displacement pump 10.

In accordance with the invention, an orifice 16 is placed in line 13. A feedback valve 17 is connected to the displacement varying means of the pump 10 and comprises a pair of mutually and oppositely adjustable laminar flow restrictions 18, 19 in series. A member 20 connects the restrictions to the variable displacement means to vary them equally and oppositely in proportion to the movements of the displacement varying means. A line 21 provides a circuit from a point downstream of the orifice 16 to the feedback device 17 and the outlet 22 of the feedback device 17 is directed to the spring end of a speed sensing valve 23. A line 24 extends from a point upstream of orifice 16 to the other end of valve 23. The speed sensing valve 23 is thus operable in response to a predetermined pressure differential between the outlet of the feedback valve 17 and the pressure upstream of the orifice to vary the displacement of the pump 10 through a line 25 to the destroking piston 14. The feedback valve 17 is similar to that disclosed in U.S. Pat. No. 3,742,820 except for the manner in which it is connected in the circuit.

Figure 4:
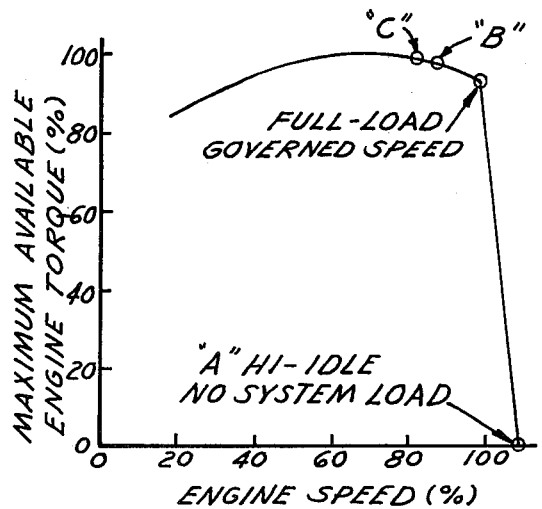
FIG. 4A is a curve of torque versus engine speed for a conventional diesel engine.
Figure 5A:
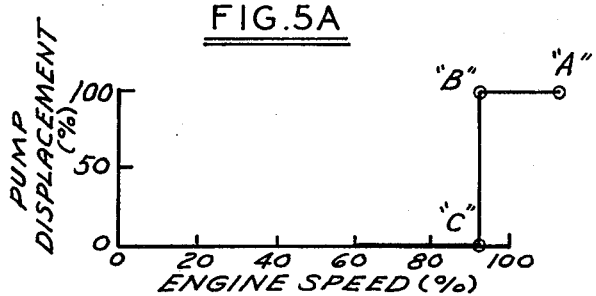
FIG. 5A is a curve of pump displacement versus engine speed for a hydraulic system not embodying the invention.
Figure 5B:
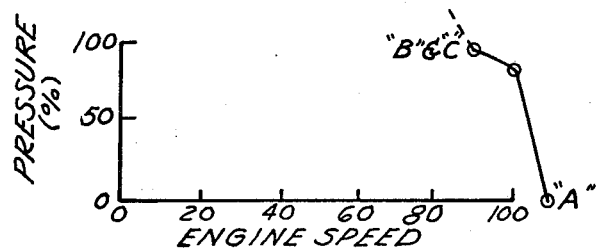
FIG. 5B is a curve of pressure versus engine speed for a hydraulic system not embodying the invention.
Figure 5C:
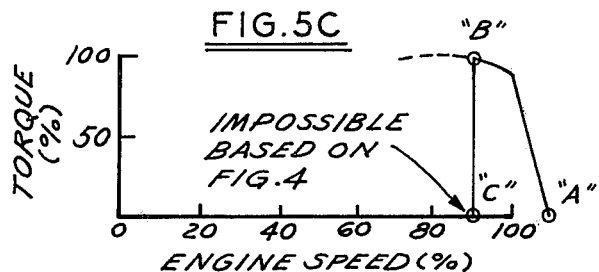
FIG. 5C is a curve of torque versus engine speed for a hydraulic system not embodying the invention.

The operation and function of the circuit can best be understood by reference to FIGS. 4, 5A, 5B, 5C, 6A, 6B and 6C. FIG. 4 is a typical curve of torque versus engine speed for a diesel engine, and the pump and engine will tend to follow this curve at all times. FIG. 5A shows the manner in which pump displacement, pressure and torque vary with engine speed for a hydraulic system not embodying the invention. For example, as the load on the pump is increased to point B, the engine speed decreases along the curve to point B in FIG. 5A. If the load is increased from point A to B, when the pump and engine are at point B, a signal is given to reduce pump displacement. At zero displacement, the engine will try to follow the torque curve back to point A and drive the pump to full displacement. However, due to the lag between engine acceleration and pump reaction, the engine may oscillate between points C and B resulting in an unstable condition.

Figure 6A:
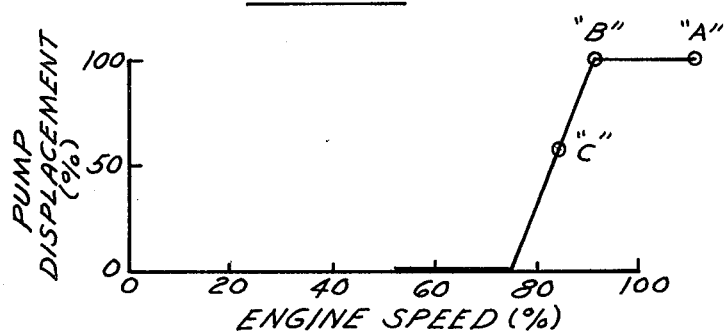
FIG. 6A is a curve of pump displacement versus engine speed for a hydraulic system embodying the invention.
Figure 6B:
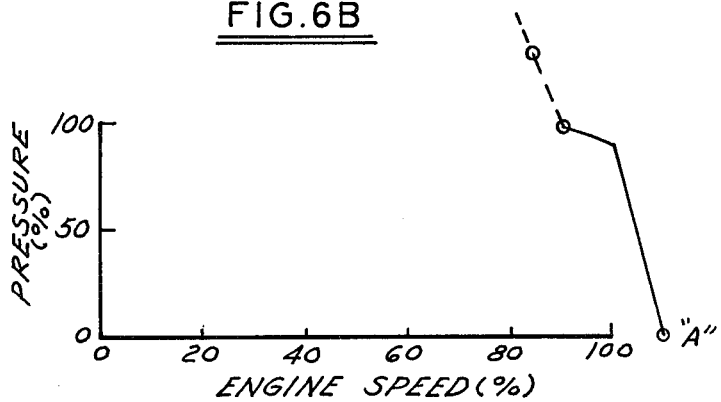
FIG. 6B is a curve of pressure versus engine speed for a hydraulic system embodying the invention.
Figure 6C:
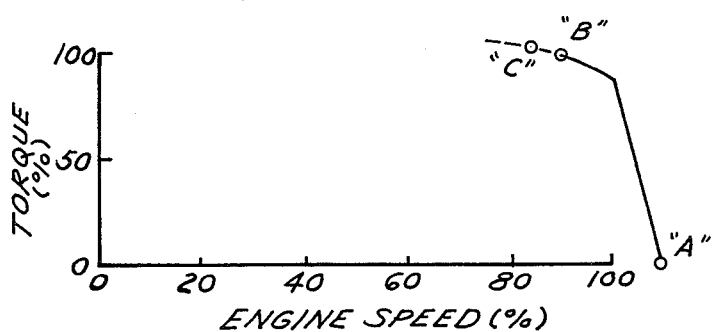
FIG. 6C is a curve of torque versus engine speed for a hydraulic system embodying the invention.

FIGS. 6A, 6B and 6C show the curves of pump displacement, pressure and torque versus engine speed for a system embodying the invention. As shown in the curve of pump displacement versus speed (FIG. 6A), the slope of the curve containing points B and C has a positive value so that condition C can exist in a stable manner. Similarly, the system embodying the invention will function in a stable manner when the pressure is constant and the mechanical load on the engine varies.

In practice the orifice means may be shared with a second identical hydraulic system wherein the charge pump and variable displacement pump are driven by the same prime mover.

FIG. 2 shows the feedback device forming a part of a variable displacement piston pump, similar parts being designated with the same number with a letter suffix a for convenience.

FIG. 3 is a sectional view of a speed sensing control valve, the parts being similarly designated.

We claim:

1. A hydraulic system comprising
   a full flow supercharged variable displacement pump including displacement varying means,
   a fixed displacement charge pump connected to the variable displacement pump such that it is driven by the same prime mover as said variable displacement pump,
   a fluid supply line for supplying fluid from said fixed displacement pump to said variable displacement pump,
   orifice means in said supply line to said variable displacement pump,
   feedback valve means responsive to the position of said displacement varying means,
   means providing a circuit from a point downstream of said orifice means to tank pressure,
   said feedback means comprising a pair of mutually and oppositely adjustable flow restrictions in series with said circuit,
   said feedback means having a fluid outlet,
   means connecting said restrictions to said displacement varying means to vary them equally and oppositely in proportion to the movements of said displacement varying means,
   a speed sensing control valve responsive to the pressure level between the two restrictions and the pressure level upstream of said orifice means,
   said speed sensing control being connected to the outlet of said variable displacement pump and operable to operate said displacement varying means of the pump when the pressure differential between the pressure at the fluid outlet of said feedback means and the pressure upstream of said orifice means falls below a predetermined value.

2. The hydraulic system set forth in claim 1 including fluid lines leading from upstream and downstream points with respect to said orifice means to another hydraulic system comprising a variable displacement pump, a fixed displacement charge pump, a feedback device and a speed sensing control valve connected in the same manner.

3. A hydraulic system comprising
   a full flow supercharged variable displacement pump including displacement varying means,
   a fixed displacement charge pump connected to the variable displacement pump such that it is driven by the same prime mover as said variable displacement pump,
   a fluid supply line for supplying fluid from said fixed displacement pump to said variable displacement pump,
   orifice means in said supply line to said variable displacement pump,
   feedback valve means responsive to the position of said displacement varying means,
   means providing a circuit from a point downstream of said orifice means to tank pressure,
   said feedback means comprising a body including a spool providing a pair of mutually and oppositely adjustable flow restrictions in series with said circuit,
   means connecting said restrictions to said displacement varying means to vary them equally and oppositely in proportion to the movements of said displacement varying means,
   a speed sensing control valve including a spool responsive to the pressure level between the two restrictions and the pressure level upstream of said orifice means,
   said speed sensing control being connected to the outlet of said variable displacement pump and operable to operate said displacement varying means to reduce the displacement of the pump when the pressure differential between the pressure at the outlet of said feedback means and the pressure upstream of said orifice means falls below a predetermined value.

* * * * *